(12) United States Patent
Iwano (10) Patent No.: US 6,820,876 B2
(45) Date of Patent: Nov. 23, 2004

(54) BOOT FOR UNIVERSAL JOINT (75) Inventor: Kazuhiro Iwano, Tochigi (JP)

(73) Assignee: Showa Corporation (JP)

( * ) Notice: Subject to any disclaimer, the term of this patent is extended or adjusted under 35 U.S.C. 154(b) by 0 days.

(21) Appl. No.: 10/385,054

(22) Filed: Mar. 10, 2003

(65) Prior Publication Data
US 2004/0007832 A1 Jan. 15, 2004

(30) Foreign Application Priority Data
Jul. 9, 2002 (JP) .................................. 2002-199459

(51) Int. Cl.⁷ .............................................. F16J 15/52
(52) U.S. Cl. ...................... 277/635; 277/552; 277/928; 464/175
(58) Field of Search ................................ 277/634–636, 277/552; 464/175

(56) References Cited

U.S. PATENT DOCUMENTS

| | | | | |
|---|---|---|---|---|
| 3,208,779 A | * | 9/1965 | Sullivan Jr. ................. | 403/134 |
| 4,210,002 A | * | 7/1980 | Dore .......................... | 464/175 |
| 4,224,808 A | * | 9/1980 | Gehrke ....................... | 464/175 |
| 4,392,838 A | | 7/1983 | Welschof et al. | |
| 4,556,400 A | * | 12/1985 | Krude et al. ................ | 464/181 |
| 4,559,025 A | * | 12/1985 | Dore .......................... | 464/175 |
| 5,015,002 A | * | 5/1991 | Goodman et al. .......... | 277/636 |
| 5,308,284 A | * | 5/1994 | Renzo et al. ............... | 464/175 |

FOREIGN PATENT DOCUMENTS

| | | | |
|---|---|---|---|
| FR | 2591301 A1 | * | 6/1987 |
| JP | 58-152930 | * | 9/1983 |
| JP | 828704 | | 7/1994 |

* cited by examiner

Primary Examiner—Alison K. Pickard
(74) Attorney, Agent, or Firm—Orum & Roth

(57) ABSTRACT

A boot for a universal joint is constructed by a boot body and a boot adapter. The one end of the boot is fitted on a propeller inner shaft via its one-end fitting portion and the other end of the boot is fitted on the outer race of the universal joint via its other-end fitting portion, thereby substantially covering the universal joint. The foregoing one-end fitting portion has an annular lip portion at its end portion. Passages for flowing air are formed on the one-end fitting portion and its annular lip portion, respectively. The passages communicate with each other through an annular partial passage between both passages. The existence of the annular partial passage increases the flowing resistance of air between the inside and the outside of the boot to reduce the pressure fluctuation in the boot and to improve the effectiveness in preventing splashed water or muddy water from intruding into the boot along with the suction of air.

4 Claims, 6 Drawing Sheets

BOOT FOR UNIVERSAL JOINT

BACKGROUND OF THE INVENTION

1. Field of the Invention

The present invention relates to a boot for a universal joint and, in particular, to a boot for a universal joint having a sealing structure that properly controls the flow of air or the like between the inside and the outside of the boot in response to a change in the inside volume of the boot based on a pressure fluctuation in the boot. The invention improves sealing performance against the intrusion of splashed water or muddy water.

2. Description of the Related Art

There has been conventionally known a boot for a universal joint having a structure which has a boot body made of an elastic material such as rubber and a boot adapter made of a plate such as a steel plate. One-end fitting portion of the boot body is fitted on the outer peripheral side of an inner shaft such as a propeller shaft or the like and the other-end fitting portion of the boot adapter is fitted on the outer race of the universal joint to prevent dust or muddy water from intruding into the universal joint.

Certain features of a boot for a universal joint are already known from a boot disclosed in Japanese Patent Application Laid-open No 8-28704. The foregoing boot 010, as shown in FIG. 9A, FIG. 9B, FIG. 10A, and FIG. 10B, has a structure for coping with the pressure fluctuation in the boot 010. There, an annular lip portion 01*b* is in contact with the inner shaft 03 of a propeller shaft or the like outside one-end fitting portion 01*a* of the boot 010. A passage 01D is present for making the inside of the boot 010 communicate with the outside thereof on the inner peripheral surface of the one-end fitting portion 01*a*, and a sealing structure is provided with discontinuous protrusions 01*c* for controlling the passage 01D in response to the pressure fluctuation in the boot 010 in a circumferential direction of the inside of the annular lip portion 01*b*. The boot 10 controls the inflow or outflow of air or the like caused by the pressure fluctuation in the boot 010 via controlling the passage 01D by the discontinuous protrusions 01*c*, to reduce a load applied to the boot 010 based on the pressure fluctuation thereby to improve the durability of the boot 010.

Figure 9A:
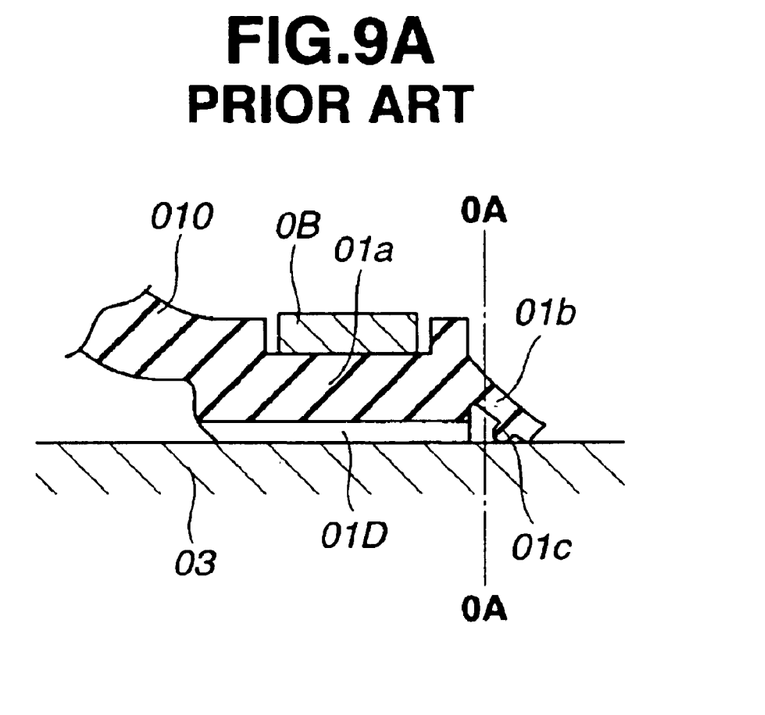
Figure 9B:
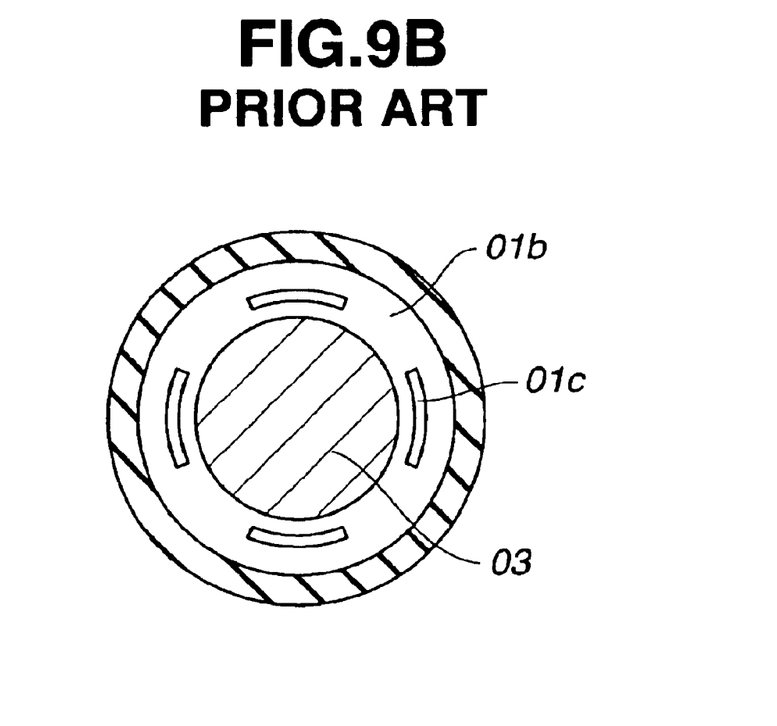

In this respect, a part denoted by a reference symbol 0B in the FIG. 9A is a fastening band used for fitting the boot 010.

However, the boot provided with the sealing structure described above does not have sufficient measures against a detrimental effect produced by the pressure fluctuation in the boot. In particular, a pressure fluctuation may occur in the boot, for example, at a time when an abrupt pressure drop is caused in the boot by an abrupt increase in the inside volume of the boot, which is caused by the boot being expanded outward by the action of a centrifugal force produced by the rotation of the boot involved by the rotation of a shaft such as the propeller shaft or the like. In other words, the boot does not have sufficient measures against splashed water or muddy water intruding into the boot through the passage, along with the outside air being sucked into the boot when a negative pressure is produced by an abrupt pressure drop in the boot.

Figure 10A:
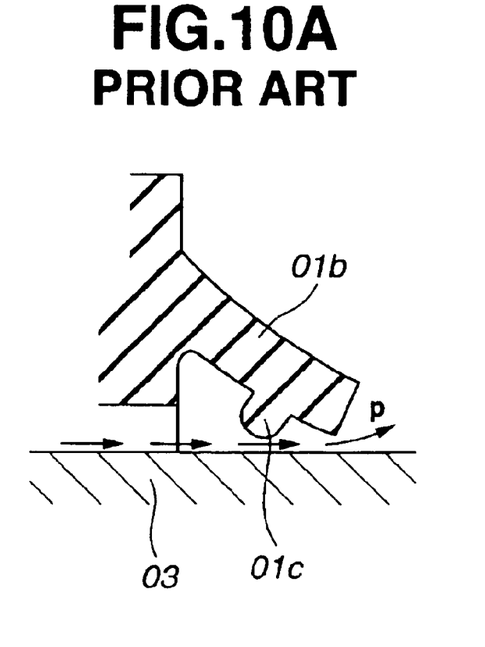
Figure 10B:
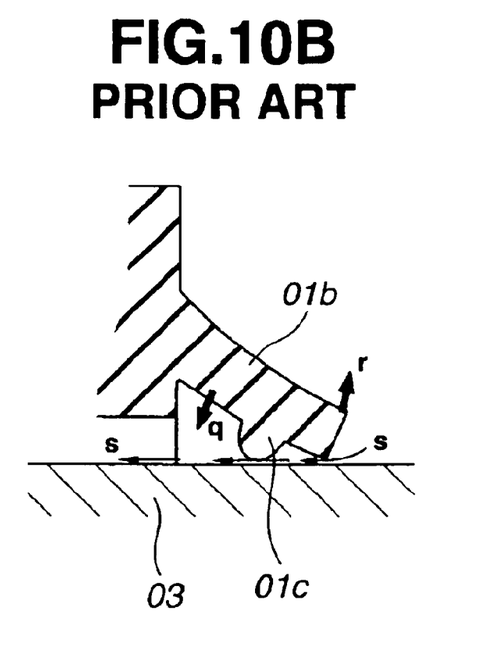
FIG. 10B is an illustration showing an embodiment where the air or the like flows into the boot.

That is, in the sealing structure of the conventional boot 010, as is evident from FIG. 10A and FIG. 10B, when pressure in the boot 010 increases, as shown in FIG. 10A, air or the like in the boot 010 pushes up the lip portion 01*b* as shown by an arrow p and thus flows out. When the pressure in the boot decreases, as shown in FIG. 10B, the lip portion 01*b* is strongly pressed on the inner shaft 03 as shown by an arrow q to be bent inward, thereby to bring the discontinuous protrusions 01*c* formed in the circumferential direction on the inside of the lip portion 01*b* into contact with the inner shaft 03. In this way, the lip portion 01*b* is supported by the protrusions 01*c*, and hence the tip portion of the lip portion 01*b* is raised up in such a manner to be separated from the inner shaft 03 as shown by an arrow r. This allows the air or the like to be smoothly sucked into the boot 010 through gaps between the discontinuous protrusions 01*c*, as shown by an arrow s, and hence raises the possibility that splashed water and muddy water will also intrude into boot along with the suction of the air or the like.

In particular, as described above, when negative pressure is produced by the abrupt pressure drop in the boot 010 caused by the boot 010 being expanded outward by the centrifugal force, a force for pressing the lip portion 01*b* in a direction shown by the arrow q is increased, to increase a tendency of raising up the tip portion of the lip portion 01*b*, as shown by the arrow r, thereby expanding a gap between the tip portion of the lip portion 01*b* and the inner shaft 03. Further, the suction force of the outside air or the like applied to the tip portion, which is produced by the negative pressure abruptly produced in the boot 010, raises the possibility that splashed water or muddy water will intrude into the boot 010 along with the suction of the air or the like.

The foregoing conventional boot, as described above, does not have a sealing structure which copes sufficiently with the splashed water or the muddy water intruding into the boot along with the suction of the outside air. The intrusion of splashed water or muddy water into the boot causes damage to the boot itself to reduce the durability of the boot. This also deteriorates the lubrication function of grease, which is a material lubricating the inside of the boot, thereby to wear the universal joint in the boot or to form rust over a short time of use, which results in significantly reducing the durability of the universal joint.

Thus, there has been a search for a boot having the sealing structure capable of properly coping with splashed water or muddy water intruding into the boot, but the fact is that there has not been developed a satisfactory boot provided with a sealing structure having a function properly coping with pressure fluctuation in the boot, and a function properly coping with splashed water or muddy water intruding into the boot.

Therefore, it is desired to quickly develop or improve a boot provided with a sealing structure capable of properly coping with the pressure fluctuation in the boot and effectively preventing splashed water or muddy water from intruding into the boot.

SUMMARY OF THE INVENTION

It is an object of the present invention, in a boot for a universal joint, to protect the universal joint and to improve the durability of the boot for the universal joint by properly controlling the flow of air between the inside and the outside of the boot caused by variations in pressure in the boot, to prevent splashed water or muddy water from intruding into the boot.

Under the circumstances, the invention provides the boot having a sealing structure capable of suitably coping with the pressure fluctuation in the boot. In particular, the invention relates to measures to remove a detrimental effect produced by a negative pressure generated in the boot by the action of a centrifugal force produced when the boot is rotated. To be more specific, the invention relates to the improvement of a boot in which a passage structure for making the inside of the boot communicate with the outside of the boot is improved from the viewpoint of preventing splashed water or muddy water from intruding into the boot when negative pressure is generated in the boot. The invention is a boot for a universal joint for coupling an input-side shaft to an output-side shaft of the type in which one end of the boot is fitted on one shaft of both the shafts via its one-end fitting portion, and the other end of the boot is fitted on the other shaft of both the shafts via its other-end fitting part, to cover the universal joint. The one-end fitting part of the boot has an annular lip portion, and the one-end fitting portion and the annular lip portion each have a partial passage. The partial passage includes an annular partial passage extending in a circumferential direction of the one-end fitting portion or the annular lip portion. The partial passages communicate with each other to form a passage for making the inside of the boot communicate with the outside of the boot.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings:

FIG. 9A and FIG. 9B are views showing the structure of a portion where a conventional boot is fitted, and its annular portion, and FIG. 9A is a sectional side view thereof, and FIG. 9B is a cross sectional view taken on a line 0A—0A in the forgoing FIG. 9A; and FIG. 10A and FIG. 10B are illustrations showing a state where the conventional annular lip portion controls the inflow and outflow of air or the like, and FIG. 10A is an illustration showing an embodiment where the air or the like flows out of the boot.

DESCRIPTION OF THE PREFERRED EMBODIMENTS

Hereafter, the preferred embodiments of the invention will be described based on the drawings.

Figure 1:
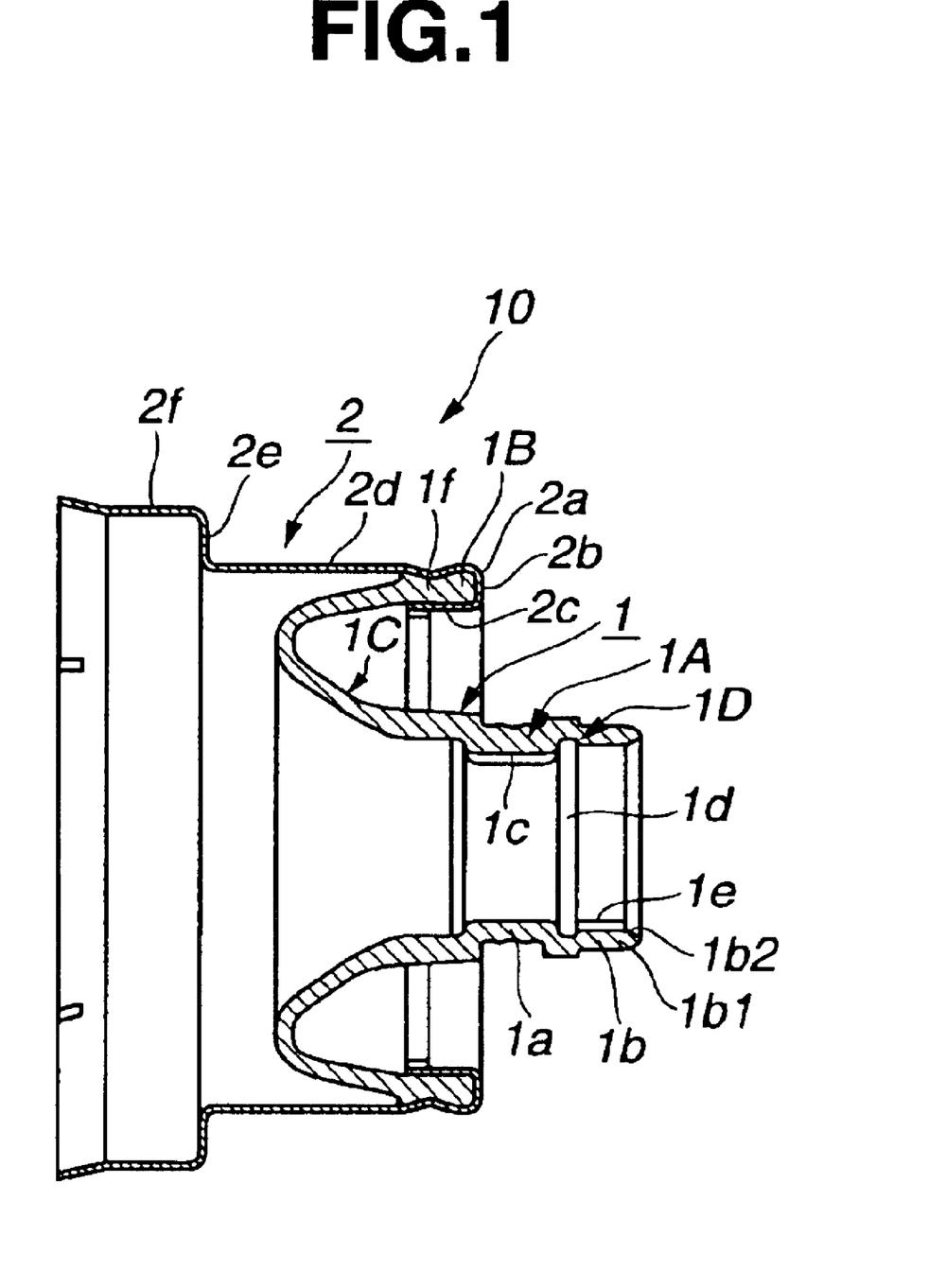
FIG. 1 is a view showing the structure of a boot for a universal joint according to the invention.

FIG. 1 shows a boot 10 for a universal joint of the invention. The boot 10 for a universal joint includes by a boot body 1 made of rubber, a flexible resin, or the like, and a boot adapter 2 formed by properly machining a plate such as a steel plate. The foregoing boot body 1 includes an inner cylindrical portion 1A, an outer cylindrical portion 1B, and a bent portion 1C that is connected to the inner cylindrical portion 1A and the outer cylindrical portion 1B, and which is formed in an annular depressed groove having a cross section formed nearly in a shape of the letter U. The foregoing outer cylindrical portion 1B of the boot body 1 is fixed by one end 2a of the boot adapter 2. The other end of the boot adapter 2 is provided with a fitting portion 2f used for fitting on the outer race of the universal joint, which is one portion of an input-side shaft (not shown).

As shown in FIG. 1, the outer cylindrical portion 1B of the boot body 1 is fixed by the one end 2a of the boot adapter 2 in the following secure manner: an annular end portion if which comprises the outer cylindrical portion 1B of the boot body 1 is pinched by the annular end portion 2b and the folded portion 2c of the one end 2a of the adapter 2, such that the folded portion 2c of the boot adapter 2 is securely clamped.

Further, the boot adapter 2 comprises a small-diameter cylindrical portion 2d extending a predetermined distance in its axial direction from the one end 2a, which is a portion for fixing the annular end portion If of the boot body 1, as a cylindrical portion having the same diameter. A collar portion 2e expands in a radial direction of the other end of the small-diameter cylindrical portion 2d. A fitting portion 2f extends in a cylindrical shape in its axial direction from the collar portion 2e and at which the boot adapter 2 fits on the other structural part, that is, a large-diameter cylindrical portion forming the fitting portion 2f fitting on the outer race of the universal joint not shown in FIG. 1.

The foregoing boot 10 has the structure described above and is fitted in a state shown in FIG. 2 as follows: the one-end fitting portion 1a of the inner cylindrical portion 1A of the boot body 1, which becomes the fitting portion of one end of the boot 10, is fitted on a propeller inner shaft 3. The fitting portion 2f, which is the large-diameter cylindrical portion of the boot adapter 2 and becomes the fitting portion of the other end of the boot 10, is fixedly pressed and fitted on the outer peripheral portion of the outer race 4a of the universal joint 4. The boot 10 is fitted between the propeller inner shaft 3 and the outer race 4a of the universal joint 4 in such a manner as to substantially cover the universal joint 4 by its bent portion 1C of the boot body 1.

Figure 2:
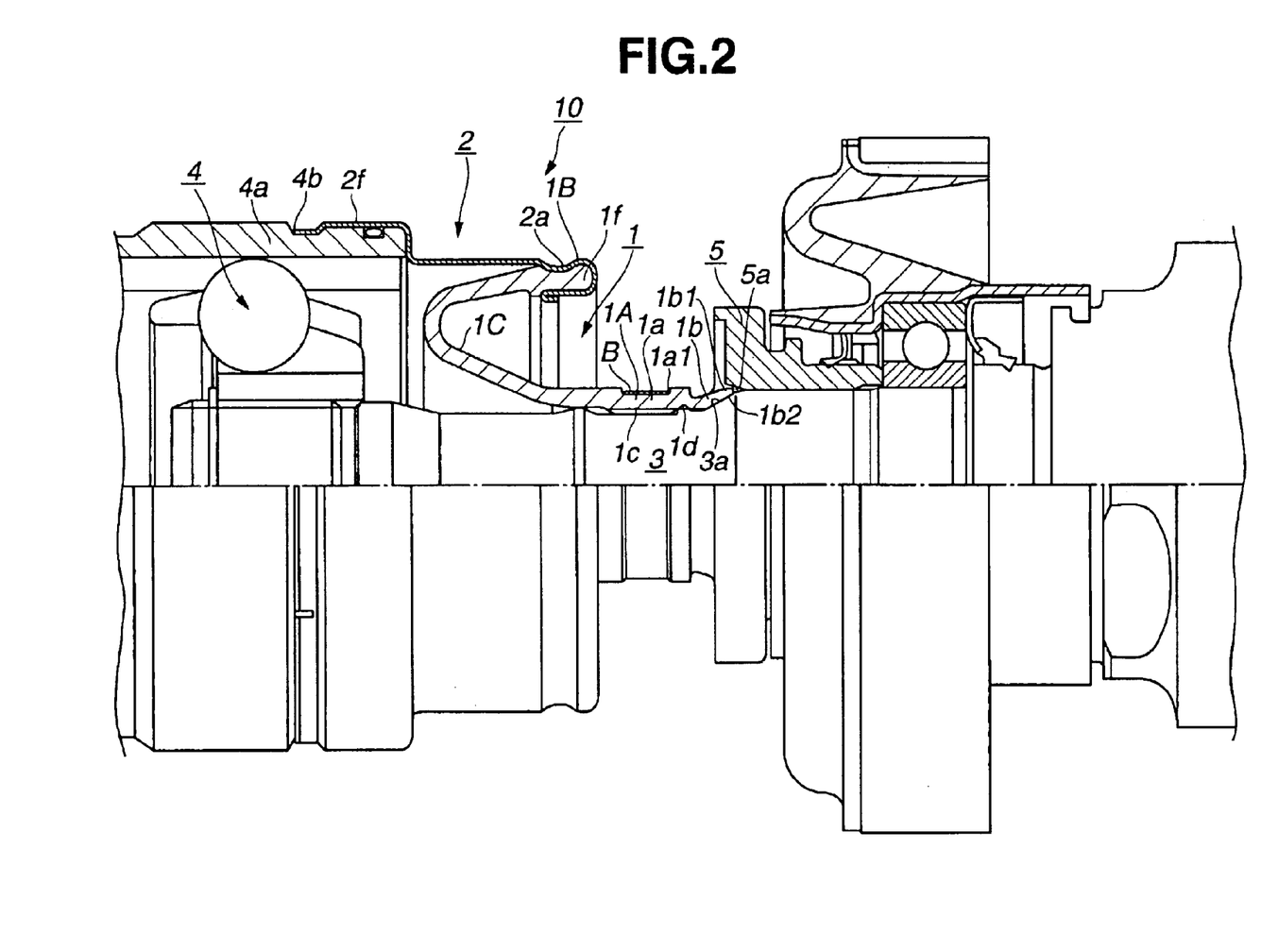
FIG. 2 is a view showing the boot for a universal joint according to the invention fitted on the propeller shaft of a vehicle.
Figure 6:
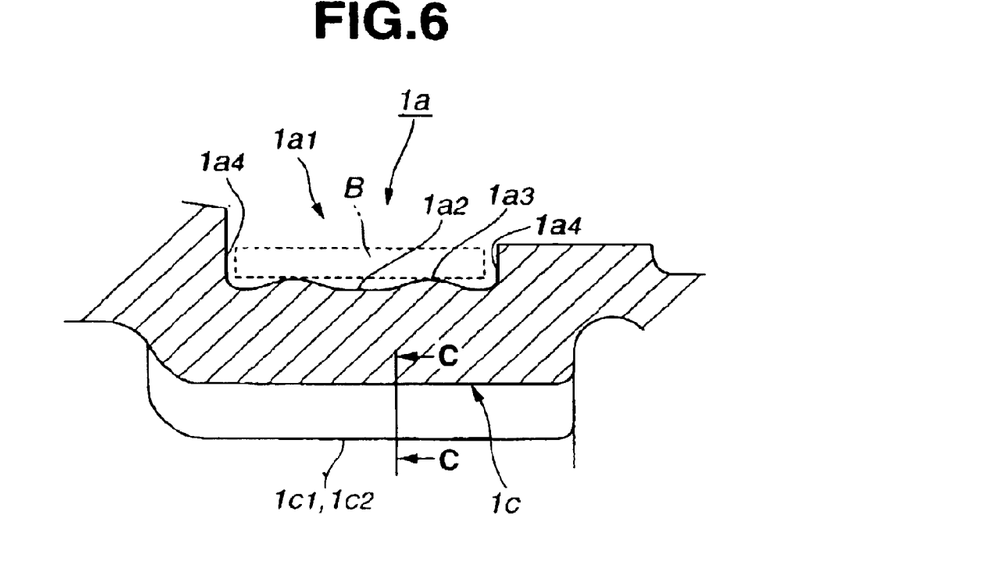
FIG. 6 is an enlarged view showing the structure of a portion where the boot of the invention is fitted.

The foregoing boot body 1, as shown in FIG. 2, is fitted on the propeller inner shaft 3 at the one-end fitting portion 1a by fastening a fastening band B near the end portion of the one-end fitting portion 1a. An annular depressed portion 1a1 used for fastening by the fastening band B is formed on the outer peripheral portion of the one-end fitting portion 1a. The bottom surface 1a2 of the annular depressed portion 1a1 is formed to have two annular protrusions 1a3 each of which is formed in a shape of a hill in cross section as shown in FIG. 6. The fastening band B is fitted in the annular depressed portion 1a1 and is fastened in such a relationship that the annular protrusions 1a3, each formed in a shape of a hill in cross section, of the bottom surface 1a2 of the annular depressed portion 1a1 are slightly collapsed. This facilitates adjustment of fastening strength to a suitable value and further prevents the fastening band B from being shifted in a fastening position in the axial direction together with the action of both side surfaces 1a4 of the annular depressed portion 1a1.

The fitting portion 2f of the other end of the boot adapter 2 is fitted on the outer race 4 as follows: as shown in FIG. 2, the large-diameter cylindrical portion which is the fitting portion 2f of the other end of the boot adapter 2 is pressed on the outer peripheral portion of the outer race 4a of the universal joint 4 from its side portion. The tip portion of the large-diameter cylindrical portion is securely clamped onto the annular depressed portion 4b of the outer peripheral portion of the outer race 4a, whereby the universal joint 4 is nearly completely covered with the boot 10, comprised of the boot body 1 and the boot adapter 2.

Since the boot 10 is fitted in the manner described above, as shown in FIG. 2, the universal joint 4 is nearly completely covered with the boot 10. Thus, the universal joint 4 is nearly completely protected from the intrusion of dust, splashed water, or muddy water from the outside by the boot 10. Further, although grease packed for lubrication is sprayed by the action of a centrifugal force produced when the universal joint 4 is rotated, the boot 10 completely prevents the grease from being sprayed outside.

On the inside-peripheral surface of the one-end fitting portion 1a of the one end of the boot body 1 a partial passage 1c is formed extending in its axial direction, for passing air or the like. The one-end fitting portion 1a has an annular lip portion 1b extending from its end as shown in FIG. 1. On the inner peripheral surface near a boundary between the one-end fitting portion 1a and the annular lip portion 1b, an annular partial passage 1d is formed extending in its circumferential direction. The annular partial passage 1d communicates with the partial passage 1c formed on the inner peripheral surface of the one-end fitting portion 1a. From the above relationship, both the partial passages 1c and 1d communicate with each other through a passage portion substantially formed in a shape of the letter T.

Figure 5:
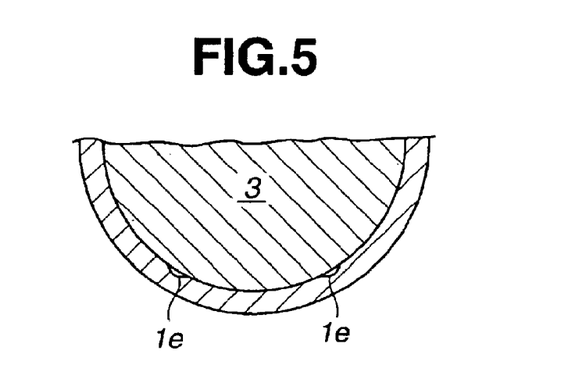
FIG. 5 is a cross sectional view taken on a line B—B in FIG. 3.

On the inner peripheral surface of the annular lip portion 1b extending from the one-end fitting portion 1a, two partial passages 1e are formed along its extending direction (see FIG. 5). The two partial passages 1e communicate with the annular partial passage 1d near the boundary between the one-end fitting portion 1a and the annular lip portion 1b at predetermined positions in its circumferential direction, respectively. The annular partial passage 1d and the two partial passages 1e also communicate with each other through passage portions substantially formed in a shape of the letter T, respectively.

Figure 8:
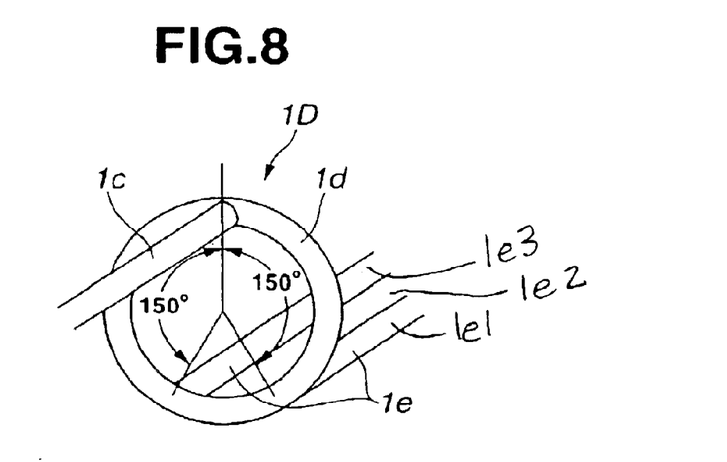
FIG. 8 is an illustration of the passage structure of the invention.

As set out in the above description, the partial passages 1c, 1d, and 1e are constructed in such a manner as to communicate with each other. One passage 1D is formed which makes the inside of the boot 10 communicate with the outside of the boot 10 through the three partial passages 1c, 1d, and 1e. Partial passage 1c is formed at the one-end fitting portion 1a and extends in the axial direction, the annular partial passage 1d is formed on the inner peripheral surface near the boundary between the one-end fitting portion 1a and the annular lip portion 1b and extends in the annular direction, and the two partial passages 1e formed on the inner peripheral surface of the annular lip portion 1b extending the axial direction from the predetermined positions in the circumferential direction of the annular partial passage 1d. The general schematic view is shown in FIG. 8.

Further described is a relationship between positions where the partial passage 1c and the two partial passages 1e communicate with the annular partial passage 1d. FIG. 8 shows the relationship between the positions where the partial passages 1c, 1d, and 1e communicate with each other. The positions where the two partial passages 1e communicate with the annular partial passage 1d are shifted in phase about 150 degrees to the left and to the right, respectively, from the position where the passage 1c communicates with the annular partial passage 1d. In this manner, the existence of the annular partial passage 1d substantially elongates the total length of the passage 1D constructed by the three partial passages 1c, 1d, and 1e.

Since the passage 1D has the structure described above and thus has its length elongated by the existence of the annular partial passage 1d and has passage portions bent at right angles at a plurality of positions by the existence of the annular partial passage 1d, the passage 1D can increase the flowing resistance of air or the like flowing through the passage 1D by its passage structure.

Figure 7:
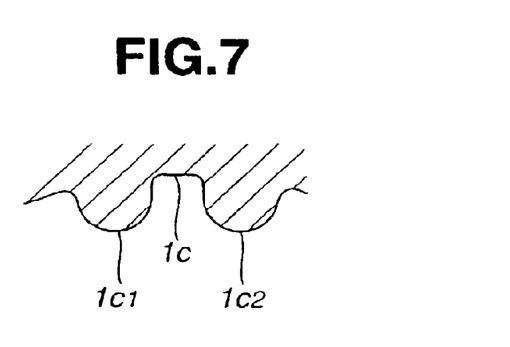
FIG. 7 is an enlarged view showing the partial passage structure of a passage for the inflow or outflow of air or the like according to the invention, and a cross sectional view taken on a line C—C in FIG. 6.

In this respect, as for the sectional shape of the three partial passages 1c, 1d, and 1e, the partial passage 1c formed on the inner peripheral surface of the one-end fitting portion 1a, as shown in FIG. 6 and FIG. 7, is formed as a groove 1c between two protrusions 1c1 and 1c2. The two partial passages 1e formed on the inner peripheral surface of the annular lip portion 1b and extending in the axial direction, and the annular partial passage 1d formed on the inner peripheral surface near the boundary between the one-end fitting portion 1a and the annular lip portion 1b, are formed as ordinary depressed grooves having no special feature.

Figure 3:
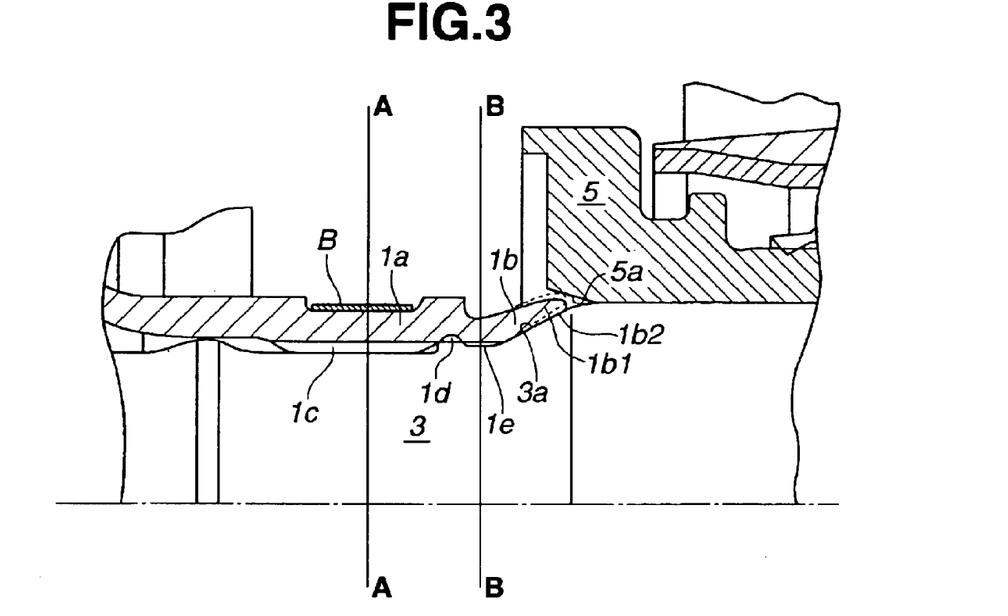
FIG. 3 is a view showing an embodiment where the tip portion of an annular lip portion according to the invention is operated by a centrifugal force.
Figure 4:
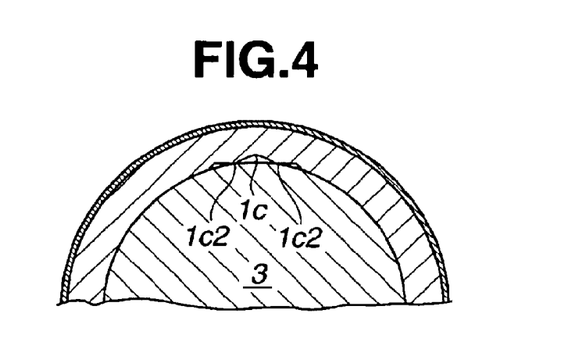
FIG. 4 is a cross sectional view taken on a line A—A in FIG. 3.

The foregoing annular lip portion 1b, as described above, has the annular partial passage 1d formed in the circumferential direction on the inner peripheral surface near the boundary between the one-end fitting portion 1a and itself. The two partial passages 1e formed on its inner peripheral surface and extending in the axial direction and its tip portion 1b1, as shown in FIG. 1, is formed as a double-sided annular tapered portion 1b2 the thickness of which becomes thinner toward its tip. When the boot 10 is not fitted, as shown in FIG. 1, the annular lip portion 1b is in a state where it extends nearly in a straight line in the axial direction. When the boot 10 is fitted, as shown in FIG. 2 and FIG. 3, the inner peripheral surface of the annular lip portion 1b abuts against the annular tapered portion 3a of the propeller inner shaft 3 to be elastically expanded in diameter. The tip portion 1b1 of the annular lip portion 1b is such that the tip portion 1b1 is close to the annular tapered portion 5a of the center bearing holding part 5 of the propeller inner shaft 3.

When the propeller inner shaft 3 is rotated, the annular lip portion 1b is elastically expanded in diameter further outward, as shown by an arrow in FIG. 3, by the centrifugal force applied to the annular lip portion 1b. When the centrifugal force exceeds a predetermined value, the tip portion 1b1 of the annular lip portion 1b is brought into press contact with the annular tapered portion 5a of the center bearing holding part 5 as shown by a broken line in FIG. 3.

Then, the tip portion 1b1 of the annular lip portion 1b being brought into press contact with the annular tapered portion 5a of the center bearing holding part 5 by the expansion in diameter of the tip portion 1b1 of the annular lip portion 1b acts to substantially interrupt or limit the flow of the air or the like between the inside of the boot 10 and the outside of the boot 10 through the passage 1D, as will be described later.

Since the boot 10 of the invention has the structure described above, it operates in the following manner.

When a vehicle runs comparatively moderate or at low speeds, generally, the propeller inner shaft 3 is moderately rotated at comparatively low speeds, so that variations in pressure in the forgoing boot 10 are small and the pressure in the forgoing boot 10 is in an ordinary state. At this time, the inside of the boot 10 is brought into communication with the outside of the boot 10 through the passage 1D including the three partial passages 1c, 1d, and 1e. That is, the partial passage 1c which is formed on the inner peripheral surface of the one-end fitting portion 1a of the one end portion of the boot 10, the annular partial passage 1d which is formed on the inner peripheral surface of the boundary between the one-end fitting portion 1a and the annular lip portion 1b, and the partial passages 1e which is formed on the inner peripheral surface of the annular lip portion 1b. Air or the like does not flow through the passage 1D because the flowing resistance is increased by its passage structure.

When the pressure in the boot 10 is increased, for example, when the pressure in the boot 10 is increased by a temperature increase in the boot 10 caused by frictional heat or the like produced at the time when the vehicle runs for a long time, or when the pressure in the boot 10 is increased by variations in the inside volume of the boot 10 due to the boot 10 being slid inward or deformed by the operation of the universal joint 4, the air or the like in the boot 10 is discharged outside through the passage 1D to prevent the pressure in the boot 10 from being increased.

Further, when the pressure in the boot 10 is decreased opposite to a case where the pressure in the boot 10 is increased, for example, when a negative pressure is produced in the boot 10 by variations in the inside volume of the boot 10 that are caused by the boot 10 being slid outward or deformed by the operation of the universal joint 4, the boot 10 is contracted, and sometimes, there is a risk that the boot 10 is brought into direct contact with the universal joint. However, when the negative pressure is produced in the boot 10, the air or the like (outside air) is sucked into the boot 10 from the outside of the boot 10 through the passage 1D to restore the boot 10 by its elasticity, so that the boot 10 is prevented from being brought into contact with the universal joint.

The negative pressure produced in the boot 10 in the state is usually comparatively slight and, taking into account an increase in the flowing resistance of air or the like produced by the passage structure of the passage 1D, that is, an increase in the flowing resistance of air or the like produced by the long passage length and the passage structure bent at right angles in the passage 1D, a sucking force of air and the like from the outside of the boot 10 into the inside thereof is reduced. This results in an extremely small possibility that when air or the like is sucked, splashed water or muddy water will be sucked into the boot 10 along with air or the like.

However, when the vehicle runs at high speeds, the propeller inner shaft 3 is rotated at high speeds, and thus the boot 10 is expanded outward by the centrifugal force produced by the rotation. Further, grease in the boot 10 is moved outward in the boot 10 by the centrifugal force to accelerate the expansion of the boot 10, whereby the boot 10 is quickly expanded to abruptly expand the inside volume of the boot 10. This in turn quickly reduces the pressure in the boot 10 and hence increases the negative pressure in the boot 10, which increases the suction force of the air or the like into the boot 10 from the outside. This increases the possibility that splashed water or muddy water will intrude into the boot 10 along with the suction of air or the like.

Thus, the boot 10 is abruptly expanded by an abrupt increase in the centrifugal force as described above, but the centrifugal force is applied in the same way also to the annular lip portion 1b of the boot 10. As shown in FIG. 3, the tip portion 1b1 of the annular lip portion 1b is expanded outward in diameter by the centrifugal force, and the tip portion 1b1 is pressed onto the annular tapered portion 5a of the center bearing holding part 5 as shown by the broken line in FIG. 3 to close an opening through which air or the like (outside air) is sucked into the boot 10. This prevents or limits the suction of air into the boot 10 through the passage 1D from the outside.

A combination of this effect and the effect of increasing the flowing resistance of fluid such as air or the like by the passage structure of the passage 1D can nearly completely prevent the intrusion of splashed water or muddy water along with the suction of the air into the boot 10.

Since the embodiment shown in FIG. 1 to FIG. 8 is constructed in the manner described above, the comparatively small pressure fluctuation in the boot produced at the time when the vehicle runs ordinarily or the like can be reduced and adjusted. The flowing resistance of air or the like flowing between the inside of the boot 10 and the outside of the boot 10 is increased by the passage structure of the passage 1D to prevent the boot 10 from being abruptly expanded or contracted, thereby making the boot 10 expand or contract comparatively moderately.

Therefore, as a result, it is possible to prevent damage of the boot 10 and hence to improve its durability and to enhance the sealing effect of the boot 10.

Moreover, even when the boot 10 is abruptly expanded by the centrifugal force and the pressure in the boot 10 is suddenly decreased to produce a negative pressure, as described above, the tip portion 1b1 of the annular lip portion 1b of the boot 10 is expanded outward in diameter by the centrifugal force to be pressed on the annular tapered surface 5a of the center bearing holding part 5. This brings the opening for sucking air or the like at the pressed portion into a closed state or a nearly closed state, thereby preventing the splashed water or muddy water from intruding into the boot 10 through the passage 1D. However, even if the opening for sucking air or the like at the pressed portion is not sufficiently closed because foreign matter such as dust or the like contaminate the pressed portion, a combination of the above-mentioned effect and the effect that the flowing resistance of the fluid such as air or the like is increased in the passage 1D by the passage structure. That is, the effect that the flowing resistance of fluid such as air or the like is increased in the passage 1D by the long passage length of the passage 1D elongated by the existence of the annular partial passage 1d and by the effect of the passage portions bent at right angles by the existence of the annular partial passage 1d. A synergy of these effects can nearly completely prevent splashed water or muddy water from intruding into the boot 10.

Various embodiments other than the specifically described embodiment are encompassed by this inventive concept.

In one embodiment, one passage 1D is provided for making the inside of the boot 10 communicate with the outside of the boot 10, but it is also recommended that a plurality of passages 1D are provided.

In one embodiment, the two partial passages 1e that communicate with the annular partial passage 1d formed on the inner peripheral surface near the boundary between the one-end fitting portion 1a and the annular lip portion 1b are provided and are formed on the inner peripheral surface of the annular lip portion 1b. The number of the partial passages 1e can be suitably selected, for example, they may be one, three, four, or the like.

It is also reccomended that the partial passage 1e that communicates with the annular partial passage 1d and is formed on the inner peripheral surface of the annular lip portion 1b be one partial passage 1e having a plurality of branch passage portions 1e1, 1e2 and 1e3.

In one embodiment, positions where the two partial passages 1e formed on the inner peripheral surface of the annular lip portion 1b communicate with the annular partial passage 1d are shifted about 150 degrees to the left and to the right, respectively, from the position where the passage 1c formed on the inner peripheral surface of the one-end fitting portion 1a communicates with the annular partial passage 1d. The positions where the two partial passages 1e communicate with the annular partial passage 1d can be suitably selected. Further, even if the number of the partial passages 1e is suitably selected, the communication positions of the partial passages 1e can be suitably selected.

In one embodiment, the cross sectional shapes of the partial passages 1c, 1d, and 1e forming the passage 1D for making the inside of the boot 10 communicate with the outside of the boot 10 are determined in the manner described above. The cross sectional shapes of the partial passages 1c, 1d, and 1e can be suitably selected without deviating from the scope and spirit of the present invention and within a range in which the invention can produce its intended effect.

In one embodiment, the tip portion 1b1 of the annular lip portion 1b is formed in a shape with a thickness becoming thinner toward the tip (double-sided tapered shape), but in order to increase its centrifugal force, it is also recommended that the tip portion 1b1 has a thick structure or has a weight part buried therein. In this case, the material of the weight part is not limited to metal but can be suitably selected.

Therefore, the shapes of the annular lip portion 1b and the tip portion 1b1 of the annular lip portion 1b are also not limited to the shapes described in the embodiment but can be suitably selected in response to the modification of the structure without deviating from the scope and spirit of the present invention, and within a range in which the invention can produce its intended effect.

As described above, according to the present invention, a boot is set out for a universal joint for coupling an input-side shaft to an output-side shaft of the type in which one end of the boot is fitted on one shaft of both the shafts via its one-end fitting portion and the other end of the boot is fitted on the other shaft of both the shafts via its other-end fitting portion, thereby to cover the universal joint. The one-end fitting portion of the boot has an annular lip portion. The one-end fitting portion and the annular lip portion each have a partial passage. The partial passage includes an annular partial passage extending in the circumferential direction of the one-end fitting portion, and the annular lip portion. The partial passages communicate with each other to form a passage for making the inside of the boot communicate with the outside of the boot. Thus, the passage formed by the three partial passages communicating with each other has an elongated total length and many bent portions because of the existence of the annular partial passage. This increases the flowing resistance of the air or the like flowing through the passage, and hence reduces the pressure fluctuation in the boot to prevent the abrupt expansion or contraction of the boot. This improves the sealing effect in the boot and further the effect of preventing the abrupt expansion or contraction of the boot prevents damage of the boot and in turn improves its durability.

Further, according to the invention, the annular partial passage is formed near a boundary between the one-end fitting portion and the annular lip portion. The partial passage formed on the one-end fitting portion and the partial passage formed on the annular lip portion communicate with the annular partial passage at predetermined positions in a circumferential direction, respectively. Thus, in addition to the effect of the above invention, it is possible to suitably adjust the phase of the positions such that the partial passage formed on the fitting portion and the partial passage formed on the annular lip portion communicate with the annular partial passage, to suitably adjust the length of the passage by adjusting the phase. Therefore, this makes it possible to suitably adjust the flowing resistance of air or the like flowing through the passage.

Still further, according to the invention, the annular partial passage communicates with the partial passage formed on the annular lip portion at a plurality of predetermined positions in the circumferential direction of the annular partial passage The partial passage formed on the annular lip portion has a plurality of partial passages or one partial passage having a plurality of branch passage portions. Therefore, in addition to the effect of the above invention, it is possible to disperse the passage for discharging or sucking air or the like, and to reduce the diameter of the passage. This acts to prevent splashed water or muddy water from intruding into the boot when air or the like is sucked.

Still further, according to the invention, each of the partial passages is formed by a groove formed on the inner peripheral surface of a structural portion on which the partial passage is formed and the outer peripheral surface of the one shaft abutting against the inner peripheral surface of the structural portion on which the groove is formed. Therefore, in addition to the effect of the above invention, according to the invention, it is possible to make the structure simple and to form the groove easily.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. A boot for a universal joint for coupling an input-side shaft to an output-side shaft of the type in which one end of the boot is fitted on one shaft of both the shafts via its one-end fitting portion and the other end of the boot is fitted on the other shaft of both the shafts via its other-end fitting portion to cover the universal joint, comprising;

one-end fitting portion of the boot having an annular lip portion, the one-end fitting portion and the annular lip portion each having a partial passage, the partial passage including an annular partial passage extending in a circumferential direction of the one-end fitting portion or the annular lip portion, the partial passages being arranged and constructed to communicate with each other to form a passage for making an inside region of the boot communicate with an outside region of the boot, wherein the annular partial passage communicates with the partial passage formed on the annular lip portion at a plurality of predetermined positions in the circumferential direction of the annular partial passage and hence the partial passage formed on the annular lip portion having a plurality of partial passages.

2. A boot for a universal joint according to claim 1, wherein the annular partial passage formed on the annular lip portion includes two partial passages which communicate with the annular partial passage at positions shifted about 150 degrees to a left side and to a right side, respectively, from a position where the partial passage formed on the one-end fitting portion communicates with the annular partial passage.

3. A boot for a universal joint for coupling an input-side shaft to an output-side shaft of the type in which one end of the boot is fitted on one shaft of both the shafts via its one-end fitting portion and the other end of the boot is fitted on the other shaft of both the shafts via its other-end fitting portion to cover the universal joint, comprising;

one-end fitting portion of the boot having an annular lip portion, the one-end fitting portion and the annular lip portion each having a partial passage, the partial passage including an annular partial passage extending in a circumferential direction of the one-end fitting portion or the annular lip portion, the partial passages being arranged and constructed to communicate with each other to form a passage for making an inside region of the boot communicate with an outside region of the boot, wherein the annular partial passage communicates with the partial passage formed on the annular lip portion at the plurality of predetermined positions in the circumferential direction of the annular partial passage, the partial passage formed in the annular lip portion having one partial passage having a plurality of branch passage portions.

4. A boot for a universal joint according to claim 3, wherein the annular partial passage formed on the annular lip portion includes two partial passages which communicate with the annular partial passage at positions shifted about 150 degrees to a left side and to a right side, respectively, from a position where the partial passage formed on the one-end fitting portion communicates with the annular partial passage.

* * * * *